Dec. 5, 1961
J. E. WALLACE
3,011,286
FISHHOOK DISGORGER
Filed May 2, 1960
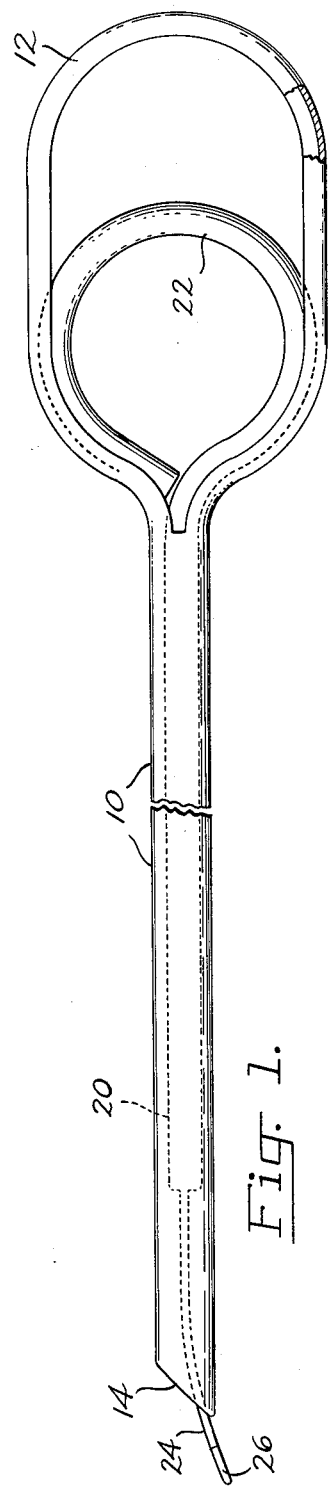
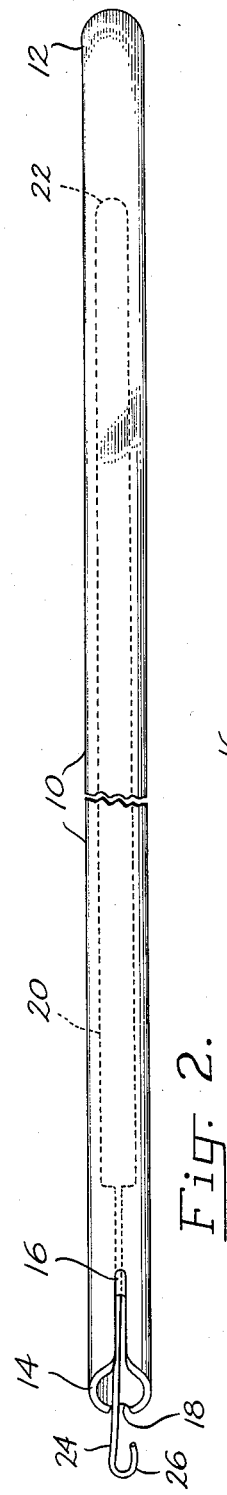
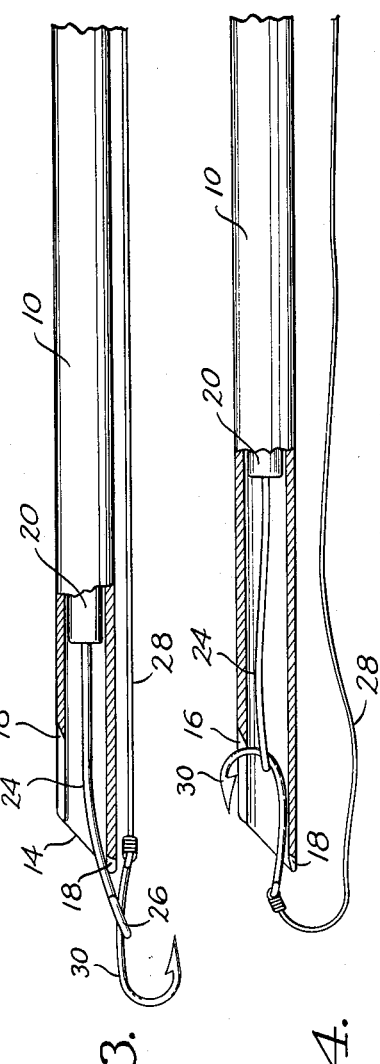
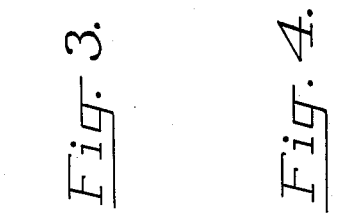
Jack E. Wallace
INVENTOR.
BY *Eugene D. Farley*
*Atty.*

United States Patent Office 3,011,286
Patented Dec. 5, 1961

3,011,286
FISHHOOK DISGORGER
Jack E. Wallace, 418 E. 82nd St., Tacoma, Wash.
Filed May 2, 1960, Ser. No. 26,334
3 Claims. (Cl. 43—53.5)

This invention relates to fishhook disgorgers.

The general object of the present invention is to provide a fishhook disgorger which can be inserted easily into the throat of a fish, being guided by the fishline until it reaches the hook, and which thereafter engages the hook securely so that it may be withdrawn quickly and with a minimum of effort.

It is another object of this invention to provide a fishhook disgorger which, upon coming in contact with a hook buried deep in the throat of a fish first inverts the hook, enabling its removal without excessive tearing of the flesh.

It is another object of this invention to provide a fishhook disgorger which covers and shields the fishhook so that it may be withdrawn easily from the fish and, after withdrawal, does not become entangled with the fish net.

It is another object of this invention to provide a fishhook disgorger which grips a fishhook securely so that it may be used as a vise to hold the hook while tieing on a leader, thereby serving a valuable secondary purpose.

It is another object of this invention to provide a fishhook disgorger which is inexpensive, positive in operation, and adaptable for use with fishhooks of various sizes.

The manner in which the foregoing and other objects of the invention are accomplished will be apparent from the accompanying specification and claims considered together with the accompanying drawings, wherein like numerals of reference indicate like parts, and wherein:

FIGS. 1 and 2 are plan and side views respectively of the fishhook disgorger of my invention; and FIGS. 3 and 4 are fragmentary sectional views showing the disgorger in its extended and retracted positions, respectively, and illustrating further its action in inverting and removing a swallowed fishhook from the throat of a fish.

In general, the fishhook disgorger of my invention comprises a tube having a plunger slidably mounted therein. One end of the tube preferably is beveled and accommodates fishhook engaging means attached to the end of the plunger. Placing the fishhook engaging means about the shank of a swallowed fishhook and thereafter retracting the plunger brings the fishhook against the beveled end of the tube, inverting the fishhook and retracting it in part within the tube so that it may be withdrawn readily from the fish.

Considering the foregoing in greater detail and with particular reference to the drawings:

The presently described fishhook disgorger comprises a tube 10 made of brass, plastic or other suitable material. One end 12 of the tube is bifurcated and preferably formed into a loop in the manner illustrated.

The other end 14 of the tube is beveled and formed with a longitudinally extending slot 16 communicating with the inner side of the beveled surface. A notch 18 is provided at the outer side thereof.

Reciprocatably mounted within tube 10 is a rod or plunger 20 which likewise may be made of brass or plastic. One of its ends is formed into a loop 22 which nests within loop 12 of tube 10.

The other end of plunger 20 mounts fishhoook engaging means comprising a wire 24 which is bent in the direction of notch 18 and the outer end of which is formed into a semi-enclosed loop 26. Sufficient clearance is left in the formation of this loop to accommodate a fishline 28 and fishhook 30.

When using the fishhook disgorger of my invention, eye 26 first is placed about the fishline which then is drawn taut. The disgorger next is worked down the line, guided by the eye, until the eye encircles the shank of the fishhook, as indicated in FIG. 3.

Plunger 20 then is retracted with the index finger from the position of FIG. 3 to that of FIG. 4. This causes the fishhook first to bear against notch 18 and then to rotate through 180° until it comes to rest partly within slot 16, as indicated in FIG. 4. In this position, the hook may readily be withdrawn from the fish without tearing the flesh and without subsequently becoming fouled in the fisherman's net or clothing.

As an ancillary but important use of the disgorger, a fishhook to which a leader is about to be attached may be secured within the device in the position illustrated in FIG. 4. The disgorger thus acts as a vise, clamping the hook securely so that a leader may be secured to it.

It is to be understood that the form of my invention herein shown and described is to be taken as a preferred example of the same and that various changes in the shape, size and arrangement of parts may be resorted to without departing from the spirit of my invention of the scope of the subjoined claims.

Having thus described my invention, I claim:

1. A fishhook disgorger comprising a tube having an outer open beveled end, a plunger slidably mounted within the tube, means for reciprocating the plunger within the tube, a fishhook-engaging loop, and connecting means connecting the fishhook engaging loop to the end of the plunger for extension outwardly through the open end of the tube for engaging a fishhook and retracting it against the end of the tube upon reciprocation of the plunger for inverting the hook, the connecting means being angled in the direction of the bevel of the outer open end of the tube and being adapted to initiate inverting movement of the hook upon engagement with the end of the tube.

2. The fishhook disgorger of claim 1 wherein the tube is provided with a longitudinal slot communicating with an inner portion of the beveled end and dimensioned to receive a fishhook.

3. The fishhook disgorger of claim 1 wherein the tube is provided with a longitudinal slot communicating with an inner portion of the beveled end and dimensioned to receive a fishhook, and an outer portion of the beveled end is provided with a notch to form a bearing point and confining seat against which the fishhook bears and inverts as it is released from the fish.

References Cited in the file of this patent

UNITED STATES PATENTS

| | | |
|---|---|---|
| 2,294,758 | Manske | Sept. 1, 1942 |
| 2,688,816 | Bondesen | Sept. 14, 1954 |
| 2,795,887 | Lockert | June 18, 1957 |